United States Patent
Ahn et al.

(10) Patent No.: US 10,619,045 B2
(45) Date of Patent: Apr. 14, 2020

(54) POLY(AMIDE-IMIDE) COPOLYMER, ARTICLE INCLUDING POLY(AMIDE-IMIDE) COPOLYMER, AND DISPLAY DEVICE INCLUDING THE SAME

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Chanjae Ahn, Suwon-si (KR); Jungha Chae, Yongin-si (KR); Won Suk Chang, Hwaseong-si (KR); A Ra Jo, Euiwang-si (KR); Sang Soo Jee, Hwaseong-si (KR); Sungwon Choi, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 15 days.

(21) Appl. No.: 15/958,549

(22) Filed: Apr. 20, 2018

(65) Prior Publication Data

US 2018/0305545 A1   Oct. 25, 2018

(30) Foreign Application Priority Data

Apr. 20, 2017 (KR) .................. 10-2017-0051205

(51) Int. Cl.
| | |
|---|---|
| C08G 73/14 | (2006.01) |
| C08L 79/08 | (2006.01) |
| C08G 73/10 | (2006.01) |
| C08J 5/18 | (2006.01) |

(52) U.S. Cl.
CPC .......... *C08L 79/08* (2013.01); *C08G 73/1007* (2013.01); *C08G 73/1039* (2013.01); *C08G 73/1042* (2013.01); *C08G 73/1078* (2013.01); *C08G 73/14* (2013.01); *C08J 5/18* (2013.01); *C08J 2379/08* (2013.01); *C08L 2203/16* (2013.01); *C08L 2203/20* (2013.01)

(58) Field of Classification Search
CPC ....... C08G 73/14; C08L 79/08; C09D 179/08; C08J 2379/08
See application file for complete search history.

(56) References Cited

U.S. PATENT DOCUMENTS

| | | | |
|---|---|---|---|
| 9,018,343 B2 | 4/2015 | Park et al. | |
| 9,706,649 B2 | 7/2017 | Jung et al. | |
| 2015/0148517 A1 | 5/2015 | Androsov et al. | |
| 2015/0152232 A1 | 6/2015 | Ju et al. | |
| 2016/0222166 A1 | 8/2016 | Ann et al. | |
| 2016/0319076 A1* | 11/2016 | Ju | ................ C08J 5/18 |

FOREIGN PATENT DOCUMENTS

| | | |
|---|---|---|
| EP | 3088440 A1 | 11/2016 |
| JP | 2010-180292 A | 8/2010 |
| KR | 10-2010-0105182 A | 9/2010 |
| KR | 10-2013-0035691 A | 4/2013 |
| KR | 10-2013-0074167 A | 7/2013 |
| KR | 10-1535343 B1 | 7/2015 |

OTHER PUBLICATIONS

Extended European Search Report dated Aug. 24, 2018, issued for the corresponding European Patent Application No. 18168465.5-1102.

* cited by examiner

*Primary Examiner* — Gregory Listvoyb
(74) *Attorney, Agent, or Firm* — Cantor Colburn LLP (57) ABSTRACT

A poly(amide-imide) copolymer including a reaction product of at least one tetracarboxylic acid dianhydride, at least one diamine, and at least one dicarboxylic acid derivative, wherein the at least one tetracarboxylic acid dianhydride includes a tetracarboxylic acid dianhydride represented by Chemical Formula 1, the at least one diamine includes a diamine represented by Chemical Formula 2, and the at least one dicarboxylic acid derivative includes a dicarboxylic acid derivative represented by Chemical Formula 3:

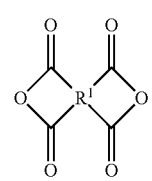

Chemical Formula 1

$NH_2 - R^2 - NH_2$

Chemical Formula 2

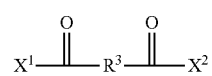

Chemical Formula 3 wherein, $R^1$ to $R^3$, $X^1$ and $X^2$ are the same as defined in the specification.

20 Claims, 1 Drawing Sheet

POLY(AMIDE-IMIDE) COPOLYMER, ARTICLE INCLUDING POLY(AMIDE-IMIDE) COPOLYMER, AND DISPLAY DEVICE INCLUDING THE SAME

CROSS-REFERENCE TO RELATED APPLICATION

This application claims priority to Korean Patent Application No. 10-2017-0051205, filed on Apr. 20, 2017, and all the benefits accruing therefrom under 35 U.S.C. § 119, the content of which is incorporated herein in its entirety by reference.

BACKGROUND

1. Field

This disclosure relates to a poly(amide-imide) copolymer, an article including a poly(amide-imide) copolymer, and a display device including an article including a poly(amide-imide) copolymer.

2. Description of the Related Art

A flexible display, which is not restricted by time and place, that is thin and flexible like paper, ultra light, and consumes a small amount of electricity, has been increasingly in demand as a display for visualizing various information and delivering it to the users. The flexible display may be realized by using a flexible substrate, organic and inorganic materials for a low temperature process, flexible electronics, encapsulation, packaging, and the like.

A transparent plastic film for replacing a conventional window cover glass to be used in a flexible display must have high hardness and excellent optical properties. Hardness may be supplemented by a hard coating layer, however, a base film having high tensile modulus also renders a final film having high hardness. Desired optical properties include high light transmittance, low haze, low yellowness index, low YI difference after exposure to UV light, and the like.

However, there remains a need for polymers having excellent optical and mechanical properties.

SUMMARY

An embodiment provides a poly(amide-imide) copolymer having improved mechanical properties, while maintaining high optical properties.

Another embodiment provides an article including the poly(amide-imide) copolymer according to an embodiment.

Still another embodiment provides a display device including the poly(amide-imide) copolymer according to an embodiment.

According to an embodiment, provided is a poly(amide-imide) copolymer including a reaction product of at least one tetracarboxylic acid dianhydride, at least one diamine, and at least one dicarboxylic acid derivative, wherein the at least one tetracarboxylic acid dianhydride includes a tetracarboxylic acid dianhydride represented by Chemical Formula 1, the at least one diamine includes a diamine represented by Chemical Formula 2, and the at least one dicarboxylic acid derivative includes a dicarboxylic acid derivative represented by Chemical Formula 3:

Chemical Formula 1 wherein, in Chemical Formula 1, $R^1$ is a substituted or unsubstituted tetravalent C4 to C20 saturated or unsaturated aliphatic hydrocarbon ring group;

$NH_2-R^2-NH_2$   Chemical Formula 2 wherein, in Chemical Formula 2, $R^2$ includes two or more substituted or unsubstituted C6 to C30 aromatic hydrocarbon ring groups, where the two or more substituted or unsubstituted C6 to C30 aromatic hydrocarbon ring groups include two or more aromatic hydrocarbon rings linked through a functional group selected from —O—, —S—, —C(=O)—, —CH(OH)—, —S(=O)$_2$—, —(CH$_2$)$_p$— wherein 1≤p≤10, —(CF$_2$)$_q$— wherein 1≤q≤10, —Si(C$_n$H$_{2n+1}$)$_2$—, —C(C$_n$H$_{2n+1}$)$_2$—, —C(C$_n$F$_{2n+1}$)$_2$—, wherein 1≤n≤10, —C(=O)NH—, and a combination thereof;

Chemical Formula 3 wherein, in Chemical Formula 3,

$R^3$ includes a substituted or unsubstituted C6 to C30 aromatic hydrocarbon ring group, wherein the substituted or unsubstituted C6 to C30 aromatic hydrocarbon ring group includes one aromatic ring, two or more aromatic rings fused together to provide a condensed ring system, or two or more moieties independently selected from the foregoing linked through a single bond or through a functional group selected from —O—, —S—, —C(=O)—, —CH(OH)—, —S(=O)$_2$—, —(CH$_2$)$_p$— wherein 1≤p≤10, —(CF$_2$)$_q$— wherein 1≤q≤10, —Si(C$_n$H$_{2n+1}$)$_2$—, —C(C$_n$H$_{2n+1}$)$_2$—, —C(C$_n$F$_{2n+1}$)$_2$—, wherein 1≤n≤10, —C(=O)NH—, and a combination thereof; and $X^1$ and $X^2$ are the same or different, and are each independently selected from a halogen, a hydroxyl group, or a C1 to C4 alkoxy group.

In Chemical Formula 1, $R^1$ may be a tetravalent C4 to C8 saturated aliphatic hydrocarbon ring group.

In Chemical Formula 2, $R^2$ may include substituted or unsubstituted two or more phenylene groups linked through a functional group selected from —O—, —S—, —C(=O)—, or —CH(OH)—, wherein the substitution of each of the two or more phenylene groups may be independently substituted by any one selected from —OH, —CF$_3$, —CCl$_3$, —CBr$_3$, —Cl$_3$, —NO$_2$, —CN, —COCH$_3$ and —CO$_2$C$_2$H$_5$.

The at least one diamine may further include a diamine represented by Chemical Formula 2A.

$NH_2-R^{2'}-NH_2$   Chemical Formula 2A wherein, in Chemical Formula 2A, $R^{2'}$ includes two or more substituted or unsubstituted C6 to C30 aromatic hydrocarbon rings linked through a single bond.

In Chemical Formula 2A, $R^{2'}$ may include two or more phenylene groups linked through a single bond, wherein each of the two or more phenylene group is substituted with any one selected from —$CF_3$, —$CCl_3$, or —$CBr_3$.

The at least one diamine may include the diamine represented by Chemical Formula 2A and the diamine represented by Chemical Formula 2, wherein $R^{2'}$ of Chemical Formula 2A includes two or more phenylene groups linked through a single bond, wherein each of the two or more phenylene groups may be substituted with any one selected from —$CF_3$, —$CCl_3$, or —$CBr_3$, and wherein $R^2$ of the Chemical Formula 2 includes two or more unsubstituted phenylene groups linked through —O—, —S—, —C(=O)—, or —CH(OH)—.

The at least one diamine may include the diamine represented by Chemical Formula 2A and the diamine represented by Chemical Formula 2, wherein $R^{2'}$ of Chemical Formula 2A includes two phenylene groups linked through a single bond, wherein each of the two phenylene groups are substituted with —$CF_3$, and wherein $R^2$ of the Chemical Formula 2 includes two unsubstituted phenylene groups linked through —O—.

An amount of the diamine represented by Chemical Formula 2 may be less than an amount of the diamine represented by Chemical Formula 2A.

A mole ratio of the diamine represented by Chemical Formula 2 and the diamine represented by Chemical Formula 2A may be from 30:70 to 1:99.

An amount of the diamine represented by Chemical Formula 2 may be less than or equal to 30 mole percent based on the total amount of the diamine.

An amount of the diamine represented by Chemical Formula 2 may be less than or equal to 20 mole percent based on the total amount of the diamine.

An amount of the diamine represented by Chemical Formula 2 may be less than or equal to 10 mole percent based on the total amount of the diamine.

In Chemical Formula 3, $R^3$ may be a phenylene group, and $X^1$ and $X^2$ are independently selected from —Cl, —OH, or —$OCH_3$.

In Chemical Formula 1, $R^1$ may be a tetravalent C4 saturated aliphatic hydrocarbon ring group.

The poly(amide-imide) copolymer may be a reaction product of the at least one tetracarboxylic acid dianhydride, the at least one diamine, and the at least one dicarboxylic acid derivative in a mole ratio of 40 to 80:100:60 to 20, respectively.

The poly(amide-imide) copolymer may be a reaction product of the at least one tetracarboxylic acid dianhydride, the at least one diamine, and the at least one dicarboxylic acid derivative in a mole ratio of 50 to 70:100:50 to 30, respectively.

According to yet another embodiment, provided is an article including the poly(amide-imide) copolymer according to an embodiment.

The article may be a film having a tensile modulus of greater than or equal to 6.5 Giga Pascal (GPa) and an average light transmittance of greater than or equal to 87.5 percent in a wavelength range of 350 nanometers to 750 nanometers (nm), when the film has a thickness of about 50 micrometers to 100 micrometers (μm).

According to still another embodiment, provided is a window film for a display device including a poly(amide-imide) copolymer according to an embodiment.

According to far still another embodiment, provided is a display device including the article according to an embodiment.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing present embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxyl group, a nitro group, a cyano group, an amino group (—NH$_2$, —NH(R$^{100}$) or —N(R$^{101}$)(R$^{102}$), wherein R$^{100}$, R$^{101}$, and R$^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon group having the specified number of carbon atoms and having a valence of one. Non-limiting examples of the alkyl group are methyl, ethyl, and propyl.

As used herein, the term "fluoroalkyl group" refers to an alkyl group as defined above, wherein one or more hydrogen atoms are substituted with a fluorine atom. Non-limiting examples of the fluoroalkyl group are fluoromethyl, 2-fluoroethyl, and 3-fluoropropyl.

As used herein, the term "alkoxy group" refers to "alkyl-O—", wherein the term "alkyl" has the same meaning as described above. Non-limiting examples of the alkoxy group are methoxy, ethoxy, and propoxy.

As used herein, the term "cycloalkyl group" refers to a monovalent group having one or more saturated rings in which all ring members are carbon. Non-limiting examples of the cycloalkyl group are cyclopentyl and cyclohexyl.

As used herein, the term "heterocycloalkyl group" refers to a cycloalkyl group as defined above, wherein one or more of the ring carbon atoms are replaced with a heteroatom selected from O, S, N, P, and Si. Non-limiting example of the heterocycloalkyl group is 2-oxacyclohexyl (2-tetrahydropyranyl).

As used herein, the term "cycloalkoxy group" refers to "cycloalkyl-O—", wherein the term "cycloalkyl" has the same meaning as described above. Non-limiting examples of the cycloalkoxy group are cyclopropoxy and cyclohexyloxy.

As used herein, the term "aryl group", which is used alone or in combination, refers to an aromatic hydrocarbon group containing at least one ring. Non-limiting examples of the aryl group are phenyl, naphthyl, and tetrahydronaphthyl.

As used herein, the term "aryloxy group" refers to "aryl-O—", wherein the term "aryl" has the same meaning as described above. Non-limiting examples of the aryloxy group are phenoxy and naphthyloxy.

As used herein, the term "heteroaryl group" refers to an aryl group as defined above, wherein one or more of the ring carbon atoms are replaced with a heteroatom selected from O, S, N, P, and Si. Non-limiting example of the heteroaryl group are 2-pyridyl and 2-furanyl.

As used herein, the terms "alkylene group", "cycloalkylene group", "heterocycloalkylene group", "arylene" group", and "heteroarylene group" refer to a divalent group respectively derived from an alkyl group, a cycloalkyl group, a heterocycloalkyl group, an aryl group, and a heteroaryl group as defined above.

As used herein, when a specific definition is not otherwise provided, the term "alkyl group" refers to a C1 to C30 alkyl group, for example a C1 to C15 alkyl group, the term "fluoroalkyl group" refers to a C1 to C30 fluoroalkyl group, the term "cycloalkyl group" refers to a C3 to C30 cycloalkyl group, for example a C3 to C18 cycloalkyl group, the term "alkoxy group" refer to a C1 to C30 alkoxy group, for example a C1 to C18 alkoxy group, the term "ester group" refers to a C2 to C30 ester group, for example a C2 to C18 ester group, the term "ketone group" refers to a C2 to C30 ketone group, for example a C2 to C18 ketone group, the term "aryl group" refers to a C6 to C30 aryl group, for example a C6 to C18 aryl group, the term "alkenyl group" refers to a C2 to C30 alkenyl group, for example a C2 to C18 alkenyl group, the term "alkynyl group" refers to a C2 to C30 alkynyl group, for example a C2 to C18 alkynyl group, the term "alkylene group" refers to a C1 to C30 alkylene group, for example a C1 to C18 alkylene group, the term "cycloalkylene group" refers to a C3 to C30 cycloalkylene group, and the term "arylene group" refers to a C6 to C30 arylene group, for example a C6 to C16 arylene group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein 1≤q≤10, —C(CH$_3$)$_2$—, —C(CF$_3$)$_2$—, and —C(=O)NH—, for example through —S(=O)$_2$—, for example an C6 to C30 aryl group or a C6 to C30 arylene group, for example a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

In addition, in the specification, the mark "*" may refer to a point of attachment to another atom.

Research efforts towards converting mobile devices, such as, a mobile phone or a tablet personal computer, and the like, to light, flexible, and bendable devices are currently ongoing. In this regard, a flexible and transparent window film for a display device having high hardness for replacing a rigid glass placed on top of the mobile devices is desired.

To be used as a window film, high hardness and good optical properties are desired. Desired optical properties include high light transmittance, low haze, low yellowness index, and the like. Hardness may be supplemented with a hard coating layer, but a base film having high tensile modulus may ensure that a final film has high hardness.

A polyimide or poly(amide-imide) copolymer has excellent mechanical, thermal, and optical properties, and thus is widely used as a plastic substrate for a display device, such as an organic light emitting diode (OLED), liquid crystal display (LCD), and the like. In order to use polyimide or poly(amide-imide) film as a window film for a flexible display device, however, further improvement of mechanical and optical properties, such as, high hardness (or modulus), high transmittance, low yellowness index, and the like, is desired. It is difficult, however, to improve both mechanical and optical properties of the film at the same time, as the modulus and yellowness index of a polyimide or poly (amide-imide) film are in a trade-off relationship with regard to each other.

Meanwhile, in an effort to improve mechanical properties of a poly(amide-imide) copolymer film, a poly(amide-imide) copolymer by increasing the amount of an amide structural unit, or by including a dianhydride having a more rigid structure has been prepared. In this case, however, tensile modulus is hardly improved, while optical properties, such as YI, are deteriorated.

The inventors of the subject matter of the present application have aimed to develop a composition for preparing a poly(amide-imide) copolymer having improved mechanical properties, such as, for example, a tensile modulus, while maintaining good optical properties. In the process of the studies, the inventors have found that a poly(amide-imide) copolymer prepared from a composition that includes a tetracarboxylic acid dianhydride including an aliphatic acid dianhydride, a diamine including a two or more aromatic rings linked by a linking group that renders flexibility, and an aromatic dicarboxylic acid derivative, exhibits further improved mechanical properties, while maintaining high optical properties.

Accordingly, an embodiment provides a poly(amide-imide) copolymer including a reaction product of at least one tetracarboxylic acid dianhydride, at least one diamine, and at least one dicarboxylic acid derivative, wherein the at least one tetracarboxylic acid dianhydride includes a tetracarboxylic acid dianhydride represented by Chemical Formula 1, the at least one diamine includes a diamine represented by Chemical Formula 2, and the at least one dicarboxylic acid derivative includes a dicarboxylic acid derivative represented by Chemical Formula 3:

Chemical Formula 1 wherein, in Chemical Formula 1, $R^1$ is a substituted or unsubstituted tetravalent C4 to C12 saturated or unsaturated aliphatic hydrocarbon ring group;

Chemical Formula 2

$NH_2$—$R^2$—$NH_2$ wherein, in Chemical Formula 2,
$R^2$ includes two or more substituted or unsubstituted C6 to C30 aromatic hydrocarbon ring groups, where the two or more substituted or unsubstituted C6 to C30 aromatic hydrocarbon ring groups include two or more aromatic rings linked through a functional group selected from —O—, —S—, —C(=O)—, —CH(OH)—, —S(=O)$_2$—, —(CH$_2$)$_p$— wherein 1≤p≤10, —(CF$_2$)$_q$— wherein 1≤q≤10, —Si(C$_n$H$_{2n+1}$)$_2$—, —C(C$_n$H$_{2n+1}$)$_2$—, —C(C$_n$F$_{2n+1}$)$_2$—, wherein 1≤n≤10, —C(=O)NH—, and a combination thereof;

Chemical Formula 3 wherein, in Chemical Formula 3,
$R^3$ includes a substituted or unsubstituted C6 to C30 aromatic hydrocarbon ring group, wherein the substituted or unsubstituted C6 to C30 aromatic hydrocarbon ring group includes one aromatic hydrocarbon ring, two or more aromatic hydrocarbon ring fused together to provide a condensed ring system, or two or more moieties independently selected from the foregoing linked through a single bond or through a functional group selected from —O—, —S—, —C(=O)—, —CH(OH)—, —S(=O)$_2$—, —(CH$_2$)$_p$— wherein 1≤p≤10, —(CF$_2$)$_q$— wherein 1≤q≤10, —Si(C$_n$H$_{2n+1}$)$_2$—, —C(C$_n$H$_{2n+1}$)$_2$—, —C(C$_n$F$_{2n+1}$)$_2$—, wherein 1≤n≤10, —C(=O)NH—, and a combination thereof; and

$X^1$ and $X^2$ are the same or different, and are each independently selected from a halogen, a hydroxy group, or a C1 to C4 alkyl group.

In Chemical Formula 1, the "substituted" in $R^1$ indicates that at least one hydrogen atom attached to the saturated or unsaturated aliphatic hydrocarbon ring may be substituted with at least one substituent selected from a hydroxyl group, a halogen group, a nitro group, a cyano group, a carboxyl group, a C1 to C20 alkyl group, a C2 to C20 alkenyl group, a C1 to C20 alkoxy group, and a C1 to C20 acyl group, or may be substituted with at least one selected from a C1 to C20 alkyl group, a C2 to C20 alkenyl group, a C1 to C20 alkoxy group, or a C1 to C20 acyl group, which may be substituted with at least one the above-listed substituent. For example, a C1 to C20 alkyl group substituted with at least one substituent may be a C1 to C20 alkyl group substituted with a halogen group, a C1 to C20 alkyl group substituted with a hydroxyl group, a C1 to C20 alkyl group substituted with a nitro group, or a C1 to C20 alkyl group substituted with a carboxyl group, but is not limited thereto.

As for $R^2$ of Chemical Formula 2 and for $R^3$ of Chemical Formula 3, the "substituted" means that at least one hydrogen atom attached to the aromatic hydrocarbon ring may be substituted with at least one substituent selected from a hydroxyl group, a halogen group, a nitro group, a cyano group, a carboxyl group, a C1 to C20 alkyl group, a C2 to C20 alkenyl group, a C1 to C20 alkoxy group, and a C1 to C20 acyl group, or may be substituted with at least one selected from a C1 to C20 alkyl group, a C2 to C20 alkenyl group, a C1 to C20 alkoxy group, or a C1 to C20 acyl group, which may be substituted with at least one the above-listed substituent. For example, a C1 to C20 alkyl group substituted with at least one substituent may be a C1 to C20 alkyl group substituted with a halogen group, a C1 to C20 alkyl group substituted with a hydroxyl group, a C1 to C20 alkyl group substituted with a nitro group, or a C1 to C20 alkyl group substituted with a carboxyl group, but is not limited thereto.

In Chemical Formula 1, $R^1$ may be a tetravalent C4 to C8 saturated aliphatic hydrocarbon ring group. For example, $R^1$ may be selected from at least one of the chemical formulae below:

In an exemplary embodiment, $R^1$ may be a tetravalent C4 saturated aliphatic hydrocarbon ring group.

By including the tetracarboxylic acid dianhydride represented by Chemical Formula 1, i.e., a tetracarboxylic acid dianhydride including a saturated or unsaturated aliphatic hydrocarbon ring group at the core, the poly(amide-imide) copolymer according to an embodiment may have substantially improved mechanical properties, such as, for example, a tensile modulus, while maintaining excellent optical properties of a poly(amide-imide) copolymer prepared from an aromatic tetracarboxylic acid dianhydride. As described later, the tetracarboxylic acid dianhydride including an aliphatic hydrocarbon ring and the dicarboxylic acid derivative including an aromatic hydrocarbon ring may be included in a mole ratio of about 40 to 80:60 to 20, for example, about 45 to 75:55 to 25, and for example, about 50 to 70:50 to 30. The combination of the dicarboxylic acid derivative including an aliphatic hydrocarbon ring and the tetracarboxylic acid dianhydride including an aromatic hydrocarbon ring may be included with the diamine represented by Chemical Formula 2 in a mole ratio of about 1:1 to prepare the poly(amide-imide) copolymer according to an embodiment. The poly(amide-imide) copolymer prepared from a reaction product of at least one tetracarboxylic acid dianhydride including the tetracarboxylic acid dianhydride represented by Chemical Formula 1, at least one diamine including the diamine represented by Chemical Formula 2, and at least one aromatic dicarboxylic acid derivative including the aromatic dicarboxylic acid derivative represented by Chemical Formula 3 may have dramatically improved mechanical properties, such as, for example, a tensile modulus, while maintaining excellent optical properties that are generally expected from a poly(amide-imide) copolymer prepared from an aromatic tetracarboxylic acid dianhydride, an aromatic diamine, and an aromatic dicarboxylic acid derivative.

In Chemical Formula 2, $R^2$ may include substituted or unsubstituted two or more phenylene groups linked through a functional group selected from —O—, —S—, —C(=O)—, or —CH(OH)—, wherein each of the substituted two or more phenylene groups may be independently substituted by any one selected from —OH, —CF$_3$, —CCl$_3$, —CBr$_3$, —Cl$_3$, —NO$_2$, —CN, —COCH$_3$ or —CO$_2$C$_2$H$_5$.

The at least one diamine may further include a diamine represented by Chemical Formula 2A:

Chemical Formula 2A wherein, in Chemical Formula 2A, $R^{2'}$ includes a substituted or unsubstituted two or more C6 to C30 aromatic hydrocarbon rings linked through a single bond.

In Chemical Formula 2A, $R^{2'}$ may include two or more phenylene groups linked through single bonds, wherein each of the phenylene group is substituted with —CF$_3$, —CCl$_3$, or —CBr$_3$.

The diamine represented by Chemical Formula 2 may include a diamine including two or more phenylene groups linked through —O—, —S—, —C(=O)—, —CH(OH)—, or a combination thereof.

The at least one diamine may include a diamine represented by Chemical Formula 2A and the diamine represented by Chemical Formula 2, wherein $R^{2'}$ of Chemical Formula 2A includes two or more phenylene groups linked through a single bond, wherein each of the two or more phenylene rings is substituted with at least one selected from —CF$_3$, —CCl$_3$, or —CBr$_3$— group, and wherein $R^2$ of Chemical Formula 2 may include two or more phenylene groups linked through —O—, —S—, —C(=O)—, or —CH(OH)—.

In an exemplary embodiment, the at least one diamine may include a diamine represented by Chemical Formula 2A of which $R^{2'}$ includes two substituted phenylene groups linked through a single bond, and the substitution of each of the phenylene ring is substituted by —CF$_3$ group, for example, 2,2'-bis(trifluoromethyl)benzidine ("TFDB"), and the diamine represented by Chemical Formula 2 of which $R^2$ includes two phenylene groups linked through —O—, for example, 4,4'-oxydianiline ("ODA").

In the combination of the diamines, the diamine represented by Chemical Formula 2 may be included in a less amount than the diamine represented by Chemical Formula 2A. For example, in the combination of the diamines, the diamine represented by Chemical Formula 2 and the diamine represented by Chemical Formula 2A may be included in a mole ratio of about 30:70 to 1:99, for example, 25:75 to 1:99, for example, 20:80 to 1:99, for example, 15:85 to 1:99, for example, 12:88 to 1:99, for example, 10:90 to 1:99, and for example, 5:95 to 1:99, but is not limited thereto.

The diamine represented by Chemical Formula 2 may be included in an amount of less than or equal to 30 mole percent (mole %) based on the total amount of the at least one diamine. For example, the diamine represented by Chemical Formula 2 may be included in an amount of less than or equal to about 25 mole %, for example, less than or equal to about 20 mole %, for example, less than or equal to about 15 mole %, for example, less than or equal to about 10 mole %, and for example, less than or equal to about 5 mole %, based on the total amount of the at least one diamine.

The diamine represented by Chemical Formula 2 may be included in an amount of greater than or equal to about 0.1 mole percent (mole %) based on the total amount of the at least one diamine. For example, the diamine represented by Chemical Formula 2 may be included in an amount of greater than or equal to about 1 mole %, for example, greater than or equal to about 2 mole %, for example, greater than or equal to about 3 mole %, for example, greater than or equal to about 4 mole %, and for example, greater than or equal to about 5 mole %, based on the total amount of the at least one diamine.

In an exemplary embodiment, the diamine represented by Chemical Formula 2 may include a diamine of which $R^2$ includes two unsubstituted phenylene groups linked through —O—, for example, 4,4'-oxydianiline ("ODA"), in an amount of less than or equal to 30 mole %, for example, less than or equal to 20 mole %, for example, less than or equal to 10 mole %, based on the total amount of the at least one diamine.

By including a diamine represented by Chemical Formula 2 wherein $R^2$ includes two or more phenylene groups linked through —O— in an amount of the above range, the poly(amide-imide) copolymer obtained therefrom may have improved mechanical properties, while excellent optical properties are not deteriorated. The diamine including two or more phenylene groups linked through —O— may impart flexibility to the poly(amide-imide) copolymer obtained therefrom. When the amount of the diamine including two or more phenylene groups linked through —O— exceeds the above range, the poly(amide-imide) copolymer obtained therefrom exhibits little improvement of mechanical properties, while optical properties, such as, for example, yellowness index, may be deteriorated.

Meanwhile, the diamine represented by Chemical Formula 2A of which $R^{2'}$ includes two phenylene groups linked through a single bond and each phenylene ring is substituted by —CF$_3$ group, for example, 2,2'-bis(trifluoromethyl)benzidine ("TFDB"), has a rigid structure as two phenylene groups are linked through a single bond, and may help the poly(amide-imide) copolymer have improved optical properties as the aromatic rings are substituted with —CF$_3$ group.

In Chemical Formula 3, $R^3$ may be a phenylene group, and $X^1$ and $X^2$ may be independently selected from —Cl, —OH, or —OCH$_3$. In an exemplary embodiment, both $X^1$ and $X^2$ may be —Cl.

The poly(amide-imide) copolymer may be a reaction product of at least one tetracarboxylic acid dianhydride including the tetracarboxylic acid dianhydride represented by Chemical Formula 1, at least one diamine including the diamine represented by Chemical Formula 2, and at least one dicarboxylic acid derivative including the dicarboxylic acid derivative represented by Chemical Formula 3 in a mole ratio of 40 to 80:100:60 to 20, for example, 50 to 70:100:50 to 30. By reacting at least one tetracarboxylic acid dianhydride including the tetracarboxylic acid dianhydride represented by Chemical Formula 1, at least one diamine including the diamine represented by Chemical Formula 2, and at least one dicarboxylic acid derivative including the dicarboxylic acid derivative represented by Chemical Formula 3 in the above ratio, the poly(amide-imide) copolymer may have further improved mechanical properties, for example, a high tensile modulus, while maintaining excellent optical properties, such as, for example, a high transmittance, a low yellowness index (YI), etc. For example, when a film having a thickness of about 50 μm to about 100 μm is fabricated from the poly(amide-imide) copolymer according to an embodiment, a tensile modulus of the film may be greater than or equal to 6.5 GPa, and a light transmittance of the film may be greater than or equal to 87.5% at wavelength ranges of from 350 nm to 750 nm. Accordingly, the film may be advantageously used for a display device, for example, as a window film for a flexible display device.

The poly(amide-imide) copolymer according to an embodiment may be prepared by using a method for preparing a poly(amide-imide) copolymer known to persons skilled in the art to which the invention pertains, by copolymerizing a tetracarboxylic acid dianhydride including the tetracarboxylic acid dianhydride represented by Chemical Formula 1, a diamine including the diamine represented by Chemical Formula 2, and a dicarboxylic acid derivative including the dicarboxylic acid derivative represented by Chemical Formula 3 in the above ratios. For example, an amide structure unit is prepared by reacting a diamine represented by Chemical Formula 2 and a dicarboxylic acid derivative represented by Chemical Formula 3, then a tetracarboxylic acid dianhydride represented by Chemical Formula 1 is added thereto to further react therewith, whereby an amic acid structure unit is prepared by the reaction of the diamine and the dianhydride, as well as the amide structure units and the amic acid structure units are linked to provide a poly(amide-amic acid) copolymer. Thus prepared poly(amide-amic acid) copolymer may be partially or completely imidized by chemical and/or thermal imidization reaction. Then, the obtained poly(amide-amic acid and/or imide) copolymer may be precipitated, filtered, and/or further heat-treated to provide a final poly(amide-imide) copolymer.

Alternatively, the poly(amide-imide) copolymer may be prepared by initially synthesizing an oligomer including an amide structure unit of which both ends are capped with an amino group by polymerizing a diamine represented by Chemical Formula 2 and an aromatic dicarboxylic acid derivative represented by Chemical Formula 3 in accordance with a conventional method for preparing a polyamide, and further polymerizing the obtained oligomer, as a diamine monomer, with the dianhydride represented by Chemical Formula 1 to prepare a poly(amide-imide) copolymer. In this method, in order for the amide structure unit-containing oligomer to have amino groups at both ends, the diamine represented by Chemical Formula 2 may be added in excess compared with the dicarboxylic acid derivative represented by Chemical Formula 3. Upon considering the amount of the amide structure unit in the obtained amide structure-containing oligomer, the amount of the tetracarboxylic acid dianhydride and the diamine to be used in the following reaction may be determined, and may be reacted to prepare the poly(amide-imide) copolymer.

Contrary to the former method for preparing a poly(amide-imide) copolymer by initially preparing an amide structure unit, followed by an imide structure unit in the same reactor, when using the latter method, a precipitation process for removing side product of a halogenated hydrogen such as, for example, HCl, produced in the reaction for preparing an amide structure unit, may not be required, and thus, the entire process time may be reduced and the yield of the final product may be increased. In addition, when using the latter method, the amount of the amide structure unit in the poly(amide-imide) copolymer may further be increased.

A film may be fabricated with the obtained poly(amide-imide) copolymer by using a conventional method for preparing a film. For example, when using a dry-wet method, a film may be manufactured by using a solution including the poly(amide-imide) copolymer, wherein a layer is formed by extruding the solution from a mouth piece on a supporter, such as drum or an endless belt, and drying the layer by evaporating the solvent from the layer until the layer has a self-maintenance property. The drying may be performed by heating, for example, from about 25° C. to about 150° C., within about 1 hour or less. Then, the dried layer may be heated from the room temperature to about 250° C. or to about 300° C. at a heating rate of about 10° C. per minute, and then be allowed to stand at the heated temperature for about 5 minutes to about 30 minutes to obtain a poly(amide-imide) copolymer film.

The layer obtained after the drying process is delaminated from the supporter, and subjected to a heat treatment process. In the heat treatment process, the layer may be heated while both ends thereof are fixed. In this method, the layer may be elongated by adjusting the length of both ends. The heat treatment may be performed at about 200° C. to about 500° C., for example, at about 250° C. to about 400° C., for several seconds to several minutes. After the heat treatment, the layer may be cooled slowly, for example, at a cooling rate of less than or equal to about 50° C. per minute. The layer may be formed as a single layer or multiple layers.

Thus obtained poly(amide-imide) copolymer film may have a tensile modulus of greater than or equal to 6.5 Giga Pascal (GPa) and an average light transmittance of greater than or equal to 87.5% in a wavelength range of 350 nanometers to 750 nanometers, when the film thickness is about 50 micrometers to 100 micrometers (μm).

For example, the film may have a tensile modulus of greater than or equal to about 6.7 GPa in the above range, for example, greater than or equal to about 6.9 GPa in the above range, for example, greater than or equal to about 7.0 GPa in the above range, for example, greater than or equal to about 7.2 GPa in the above range. For example, the film may have a tensile modulus of from about 6.5 GPa to about 20 GPa in the above range, for example, from about 6.7 GPa to about 20 GPa in the above range, for example, from about 6.9 GPa to about 15 GPa in the above range, for example, from about 7.0 GPa to about 13 GPa in the above range, for example, from about 7.0 GPa to about 10 GPa in the above range, for example, from about 7.5 GPa to about 10 GPa in the above range, for example, from about 8.0 GPa to about 10 GPa in the above range.

The yellowness index (YI) of the film may be less than 1.

That is, the poly(amide-imide) copolymer according to an embodiment may have good mechanical properties, for example, a very high tensile modulus, as well as excellent optical properties.

As described above, the poly(amide-imide) copolymer according to an embodiment may maintain good optical properties, as well as have further improved mechanical properties, for example, a high tensile modulus, and thus, may be advantageously used for a display device, for example, as a window film for a flexible display device.

In another embodiment, an electronic device includes a poly(amide-imide) copolymer film according to an embodiment. In the electronic device, the film may be used as a substrate, an insulator film, a dielectric layer, a planarization film, a protection layer, a protection film, and the like.

The electronic device may be a plane display, a touch panel, a solar cell, an electronic window (e-window), a heat mirror, a transparent transistor, a flexible display, a complementary metal-oxide semiconductor ("CMOS") sensor, or a light emitting diode lamp.

Hereinafter, a plane display as an example of the electronic device will further be described in detail referring to the drawings.

Figure 1:
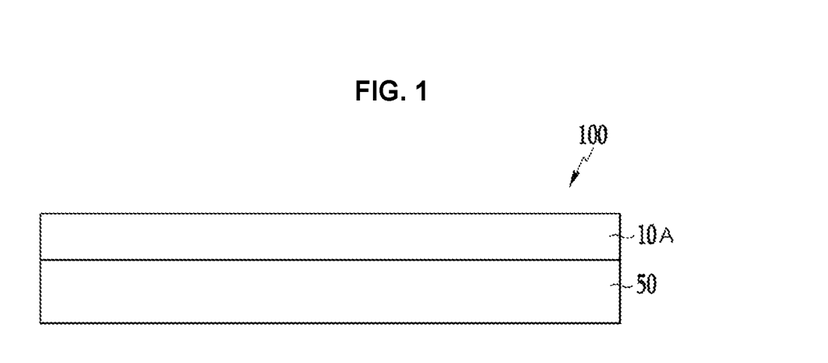
FIG. 1 shows a sectional view of a display device according to an embodiment.

FIG. 1 shows a sectional view of a display device according to an embodiment.

Referring to FIG. 1, a display device 100 includes a display panel 50 and a window 10A.

Display panel 50 may be, for example, an organic light emitting display ("OLED") panel or a liquid crystal display ("LCD") panel, an may be, for example, a bendable display panel, a foldable display panel, or a rollable display panel.

Window 10A may include the poly(amide-imide) copolymer according to an embodiment. Window 10A may be disposed on a side of an observer.

An optional film, for example, a single layer or a multiple layers of a polymer layer (not shown), and optionally, a transparent adhesive layer, may further be interposed between the display panel 50 and the window 10A.

Figure 2:
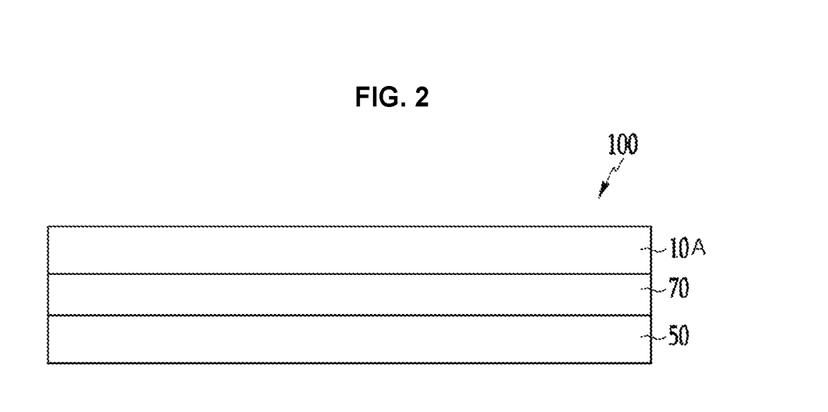
FIG. 2 shows a sectional view of a display device according to another embodiment.

FIG. 2 shows a sectional view of a display device according to another embodiment.

Referring to FIG. 2, a display device includes a display panel 50, a window 10A, and a touch screen panel 70 interposed between the display panel 50 and window 10A.

Display panel 50 may be, for example, an organic light emitting diode ("OLED") panel or a liquid crystal display ("LCD") panel, and may be, for example, a bendable display panel, a foldable display panel, or a rollable display panel.

Window 10A may include the poly(amide-imide) copolymer according to an embodiment. Window 10A may be disposed on a side of an observer.

Touch screen panel 70 may be disposed in contact with the window 10A and the display panel 50, and thus, when a touch by hand or an article is sensed through the window 10A, the position touched and changed may be sensed and a touch signal may be outputted. An operation module (not shown) may confirm the touched position through the outputted touch signal, the icon in the touched position, and operate the function corresponding to the icon, and the result of the operation may be displayed in the display panel 50.

An additional film, for example, a single layer or a multiple layers of a polymer layer (not shown), and optionally, a transparent adhesive layer, may further be interposed between the touch screen panel 70 and the window 10A.

The display device may be applied to various electronic instruments for example, a smart phone, a tablet personal computer, a camera, touchscreen equipment, and the like, and is not limited thereto.

Hereinafter, the technology of this disclosure is described in detail with reference to examples. The following examples and comparative examples are not restrictive but are illustrative.

EXAMPLES

Synthesis Example 1: Preparation of an Amide Structure Unit 70% Containing Oligomer A0-70

An amide structure unit containing oligomer, as a diamine monomer, is prepared by reacting TPCl and 2,2'-bis(trifluoromethyl)benzidine (TFDB), in accordance with Reaction Scheme 1:

Reaction Scheme 1

Amide Oligomer

That is, 177 grams (g) of N,N-dimethyl acetamide (DMAc) is charged into a 250 milliliters (mL) round-bottomed flask, equipped with a stirrer, a nitrogen gas inlet, a dropping funnel, a thermostat, and a cooler. The flask is evacuated and filled with nitrogen gas, the temperature is set to 25° C., and 9.04 grams (g) of 2,2'-bis(trifluoromethyl)benzidine (TFDB) is added and dissolved. Then, 6.2 g of pyridine is added, and 3.99 g of terephthaloyl chloride (TPCl) is slowly added. After completion of TPCl addition, the temperature is set to 40° C., and the reaction is allowed to proceed. Upon completion of the reaction, a 5% NaCl solution is added to cause precipitation, and the precipitate is filtered and dried in a vacuum oven at 80° C. to obtain white powder.

The obtained powder is an amide structure unit-containing oligomer having amino groups capping both ends thereof, as represented in Reaction Scheme 1, and hereinafter, is referred to as "A0-70". By using the A0-70 oligomer, a poly(amide-imide) copolymer is synthesized in the below Examples. Considering the average number "n" of the amide structure unit in the A0-70 oligomer is 2.33, the amount of each monomer to use in the Examples and Comparative Examples can be calculated.

Example 1: Preparation of Poly(Amide-Amic Acid) Copolymer 168 g of N,N-dimethyl acetamide (DMAc) is charged into a 250 ml round-bottomed flask, equipped with a stirrer, a nitrogen gas inlet, a dropping funnel, a thermostat, and a cooler. The flask is evacuated and filled with nitrogen gas, and 8.6 grams (g) of the A0-70 oligomer obtained in Synthesis Example 1 is added. The temperature is set to 25° C., and 1.34 g of 2,2'-bis(trifluoromethyl)benzidine (TFDB) and 1.4 g of 4,4'-oxydianiline (ODA) are added and dissolved. Then, 10.5 g of cyclobutane tetracarboxylic dianhydride (CBDA) is added, and the reagent is allowed to dissolve and react for a predetermined time. The temperature of the reaction solution is set to 25° C. Upon completion of the reaction, a poly(amide-amic acid) copolymer solution having a solid content of about 16 weight percent (%) is obtained.

Example 2: Preparation of Poly(Amide-Amic Acid) Copolymer

A poly(amide-amic acid) copolymer solution is obtained by using the same method as in Example 1, except that the amount of A0-70 oligomer is adjusted to set the amount of TPCl as 0.4 mole equivalent, and that the amount of CBDA is set to 0.6 mole equivalent.

Example 3: Preparation of Poly(Amide-Amic Acid) Copolymer

A poly(amide-amic acid) copolymer solution is obtained by using the same method as in Example 1, except that the amount of A0-70 oligomer is adjusted to set the amount of TPCl as 0.5 mole equivalent, and that the amount of CBDA is set to 0.5 mole equivalent.

Example 4: Preparation of Poly(Amide-Amic Acid) Copolymer

A poly(amide-amic acid) copolymer solution is obtained by using the same method as in Example 1, except that the amount of A0-70 oligomer is adjusted to set the amount of TPCl as 0.5 mole equivalent, the mole ratio of TFDB and ODA is set on 9:1, and that the amount of CBDA is set to 0.5 mole equivalent.

Example 5: Preparation of Poly(Amide-Amic Acid) Copolymer

A poly(amide-amic acid) copolymer solution is obtained by using the same method as in Example 1, except that the mole ratio of TFDB and ODA is set to 9:1.

Example 6: Preparation of Poly(Amide-Amic Acid) Copolymer

A poly(amide-amic acid) copolymer solution is obtained by using the same method as in Example 1, except that the amount of A0-70 oligomer is adjusted to set the amount of TPCl as 0.4 mole equivalent, the mole ratio of TFDB and ODA is set to 9:1, and that the amount of CBDA is set to 0.6 mole equivalent.

Comparative Example 1: Preparation of Poly(Amide-Amic Acid) Copolymer

A poly(amide-amic acid) copolymer solution is obtained by using the same method as in Example 1, except that the amount of A0-70 oligomer is adjusted to set the amount of TPCI as 0.5 mole equivalent, the amount TFDB is set on 1 mole equivalent as the only diamine component, and that the amount of CBDA is set to 0.5 mole equivalent.

Comparative Example 2: Preparation of Poly(Amide-Amic Acid) Copolymer

A poly(amide-amic acid) copolymer solution is obtained by using the same method as in Example 1, except that the amount of A0-70 oligomer is adjusted to set the amount of TPCI as 0.4 mole equivalent, the amount of TFDB is set to 1 mole equivalent as the only diamine component, and that the amount of CBDA is set to 0.6 mole equivalent.

Comparative Example 3: Preparation of Poly(Amide-Amic Acid) Copolymer

A poly(amide-amic acid) copolymer solution is obtained by using the same method as in Example 1, except that the amount of A0-70 oligomer is adjusted to set the amount of TPCI as 0.3 mole equivalent, the amount of TFDB is set to 1 mole equivalent as the only diamine component, and that the amount of CBDA is set to 0.7 mole equivalent.

Comparative Example 4: Preparation of Poly Amic Acid 162 g of N,N-dimethyl acetamide (DMAc) is charged into a 250 ml round-bottomed flask, equipped with a stirrer, a nitrogen gas inlet, a dropping funnel, a thermoset, and a cooler. The flask is evacuated and filled with nitrogen gas, and the temperature is set on 40° C. Then, 13.75 g of 2,2'-bis(trifluoromethyl)benzidine (TFDB) and 2.15 g of 4,4'-oxydianiline (ODA) are added and dissolved. Upon completely dissolving the two diamines, 7.37 g of CBDA is added, and upon completely dissolving CBDA, 4.74 g of 3,3',4,4'-biphenyl tetracarboxylic dianhydride (BPDA) is added. Further 10 g of DMAc is added to completely dissolve the reactants attached to or remain in the wall of the containers or reactor. Upon completion of dissolving the reactants, further reaction is allowed to proceed for another 24 hours to complete the reaction.

Comparative Example 5: Preparation of Poly(Amide-Amic Acid) Copolymer

A poly(amide-amic acid) copolymer solution is obtained by using the same method as in Example 1, except that the amount of A0-70 oligomer is adjusted to set the amount of TPCI as 0.3 mole equivalent, the amount of TFDB is set to 1 mole equivalent as the only diamine component, that the amount of CBDA, as an aliphatic dianhydride, is set on 0.5 mole equivalent, and that the amount of 4,4'-oxydiphthalic tetracarboxylic dianhydride (ODPA), as an aromatic dianhydride, is set to 0.2 mole equivalent.

Synthesis Example and Evaluation: Manufacturing Poly(Amide-Imide) Copolymer Films and Evaluation Thereof 4.1 grams of acetic anhydride is added to each of 50 grams of the polymer or copolymer solutions according to Examples 1 to 6 and Comparative Examples 1 to 5, and stirred for 30 minutes. Then, 0.4 grams of pyridine is added to each solution, and the solutions are casted on the glass by using a doctor-blade before being solidified. The casted solutions are heat-treated on a hot plate set on 130° C. for 30 minutes for drying. Then, the films are delaminated from the glass and fixed to frames, and are heat-treated from room temperature to about 260° C. at a heating rate of 10° C./minute and allowed for 20 minutes at 260° C.

The composition, tensile moduli, yellowness indices (YI), and light transmittance of the obtained films are determined, and the results are described in Table 1 below.

Yellowness index and light transmittance are measured for a film having a thickness of about 50 micrometers, according to an ASTM D1925 method by using a spectrophotometer, CM-3600d made by Konica Minolta Inc.

Tensile modulus is measured by using an ASTM D882 method.

TABLE 1

| | CBDA | TPCI | BPDA | ODPA | TFDB | ODA | thickness (μm) | Modulus (GPa) | YI | Transmittance @350~750 nm |
|---|---|---|---|---|---|---|---|---|---|---|
| Example 1 | 70 | 30 | — | — | 80 | 20 | 47 | 6.5 | 2.5 | 88.9% |
| Example 2 | 60 | 40 | — | — | 80 | 20 | 47 | 6.7 | 3.2 | 88.7% |
| Example 3 | 50 | 50 | — | — | 80 | 20 | 49 | 6.9 | 4.9 | 87.7% |
| Example 4 | 50 | 50 | — | — | 90 | 10 | 49 | 7.5 | 3.3 | 88.4% |
| Example 5 | 70 | 30 | — | — | 90 | 10 | 45 | 7.0 | 2.7 | 89.1% |
| Example 6 | 60 | 40 | — | — | 90 | 10 | 48 | 7.0 | 2.9 | 88.8% |
| Comparative Example 1 | 50 | 50 | — | — | 100 | — | 50 | Brittle | | |
| Comparative Example 2 | 60 | 40 | — | — | 100 | — | 49 | Brittle | | |
| Comparative Example 3 | 70 | 30 | — | — | 100 | — | 49 | Brittle | | |
| Comparative Example 4 | 70 | — | 30 | — | 80 | 20 | 49 | 5.7 | 6.2 | 88.6% |
| Comparative Example 5 | 50 | 30 | — | 20 | 100 | — | 48 | 5.9 | 3.5 | 89.3% |

As described in Table 1 above, the films prepared from the poly(amide-imide) copolymers according to Examples 1 to 6, all of which include a dianhydride including an aliphatic saturated hydrocarbon ring, and a diamine including two or more aromatic rings linked through —O—, a flexibility imparting group, show high tensile moduli greater than or equal to 6.5 GPa.

Meanwhile, the copolymers according to Comparative Examples 1 to 3 include the same dianhydrides and aromatic dicarboxylic acid derivatives as Examples 1 to 3, but do not include a diamine including two or more aromatic rings linked through —O—, a flexibility imparting group, are too brittle to be fabricated as a film. That is, while inclusion of an aliphatic acid dianhydride as a dianhydride component improves mechanical properties, such as, for example, a tensile modulus, it is noted that another component to impart flexibility to a film is needed.

On the contrary, the polyimide film prepared from the polyamic acid according to Comparative Example 4, which includes a diamine including two or more aromatic rings linked through —O—, a flexibility imparting group, and an aliphatic acid dianhydride as a dianhydride component, show much lower tensile modulus than those according to Examples 1 to 6, regardless of including BPDA, which is an aromatic dianhydride having a rigid structure by including two aromatic rings linked through a single bond, instead of the aromatic dicarboxylic acid derivative. That is, it is proved that a film fabricated from a poly(amide-imide) copolymer prepared from an aliphatic acid dianhydride and an aromatic dicarboxylic acid derivative has much better mechanical properties than a polyimide film.

Again, the film prepared from a poly(amide-imide) copolymer according to Comparative Example 5, which includes an aliphatic acid dianhydride and an aromatic dicarboxylic acid derivative, where the amount of the sum of the aliphatic acid dianhydride and the aromatic dicarboxylic acid derivative is less than those in Examples 1 to 6, and further includes ODPA, which has two aromatic rings linked through the flexibility imparting group —O—, but does not include a diamine including two aromatic rings linked through the flexibility imparting group, exhibits lower tensile modulus than those of Examples 1 to 6.

Meanwhile, while the poly(amide-imide) copolymer films according to Examples 1 to 6 exhibit high light transmittance of greater than or equal to 87.7% at a wavelength range between 350 nm and 750 nm, and low YI of up to 4.9, the polyimide film according to Comparative Example 4 shows 88.6% of the light transmittance and 6.2 of YI. Accordingly, it is noted that the poly(amide-imide) copolymer films according to Examples 1 to 6 have also superior optical properties to the polyimide film according to Comparative Example. That is, both the mechanical and optical properties of the poly(amide-imide) copolymer films according to Examples 1 to 6 are superior to those of the polyimide film according to Comparative Example 4.

As shown above, the poly(amide-imide) copolymer according to an embodiment have further improved mechanical properties, while maintaining excellent optical properties, and thus may be advantageously used for a display device, for example, a window film of a flexible display device.

While this disclosure has been described in connection with what is presently considered to be practical exemplary embodiments, it is to be understood that the disclosure is not limited to the presented embodiments, but, on the contrary, is intended to cover various modifications and equivalent arrangements which are included within the spirit and scope of the appended claims.

What is claimed is:

1. A poly(amide-imide) copolymer comprising a reaction product of at least one tetracarboxylic acid dianhydride, at least one diamine, and at least one dicarboxylic acid derivative, wherein the at least one tetracarboxylic acid dianhydride comprises a tetracarboxylic acid dianhydride represented by Chemical Formula 1, the at least one diamine comprises a diamine represented by Chemical Formula 2, and the at least one dicarboxylic acid derivative comprises a dicarboxylic acid derivative represented by Chemical Formula 3; wherein an amount of the diamine represented by Chemical Formula 2 is less than or equal to 30 mole percent based on the total amount of the at least one diamine:

Chemical Formula 1 wherein, in Chemical Formula 1, $R^1$ is a substituted or unsubstituted tetravalent C4 to C12 saturated or unsaturated aliphatic hydrocarbon ring group;

$$NH_2—R^2—NH_2 \qquad \text{Chemical Formula 2}$$

wherein, in Chemical Formula 2, $R^2$ comprises two or more substituted or unsubstituted C6 to C30 aromatic hydrocarbon ring groups, wherein the two or more substituted or unsubstituted C6 to C30 aromatic hydrocarbon ring groups comprise two or more aromatic hydrocarbon rings linked through a functional group selected from —O—, —S—, —C(=O)—, —CH(OH)—, —S(=O)$_2$—, —(CH$_2$)$_p$— wherein 1≤p≤10, —(CF$_2$)$_q$— wherein 1≤q≤10, —Si(C$_n$H$_{2n+1}$)$_2$—, —C(C$_n$H$_{2n+1}$)$_2$—, —C(C$_n$F$_{2n+1}$)$_2$—, wherein 1≤n≤10, —C(=O)NH—, and a combination thereof;

Chemical Formula 3 wherein, in Chemical Formula 3, $R^3$ comprises a substituted or unsubstituted C6 to C30 aromatic hydrocarbon ring group, wherein the substituted or unsubstituted C6 to C30 aromatic hydrocarbon ring group comprises one aromatic hydrocarbon ring, two or more aromatic hydrocarbon rings fused together to provide a condensed ring system, or two or more moieties independently selected from the foregoing linked through a single bond or through a functional group selected from —O—, —S—, —C(=O)—, —CH(OH)—, —S(=O)$_2$—, —(CH$_2$)$_p$— wherein 1≤p≤10, —(CF$_2$)$_q$— wherein 1≤q≤10, —Si(C$_n$H$_{2n+1}$)$_2$—, —C(C$_n$H$_{2n+1}$)$_2$—, —C(C$_n$F$_{2n+1}$)$_2$—, wherein 1≤n≤10, —C(=O)NH—, and a combination thereof; and $X^1$ and $X^2$ are the same or different, and are each independently selected from a halogen, hydroxy group, or a C1 to C4 alkoxy group.

2. The poly(amide-imide) copolymer according to claim 1, wherein in Chemical Formula 1, $R^1$ is a tetravalent C4 to C8 saturated aliphatic hydrocarbon ring group.

3. The poly(amide-imide) copolymer according to claim 1, wherein in Chemical Formula 2, $R^2$ comprises a substituted or unsubstituted two or more phenylene groups linked through a functional group selected from —O—, —S—, —C(=O)—, or —CH(OH)—, wherein the substitution of each of the two or more phenylene groups is substituted by any one selected from —OH, —CF$_3$, —CCl$_3$, —CBr$_3$, —CI$_3$, —NO$_2$, —CN, —COCH$_3$ and —CO$_2$C$_2$H$_5$.

4. The poly(amide-imide) copolymer according to claim 1, wherein the at least one diamine further comprises a diamine represented by Chemical Formula 2A:

NH$_2$—R$^{2'}$—NH$_2$     Chemical Formula 2A wherein, in Chemical Formula 2A,
R$^{2'}$ comprises substituted or unsubstituted two or more C6 to C30 aromatic hydrocarbon rings linked through a single bond.

5. The poly(amide-imide) copolymer according to claim 4,
wherein in Chemical Formula 2A, R$^{2'}$ comprises two or more phenylene groups linked through a single bond, and
wherein each of the phenylene group is substituted with any one selected from —CF$_3$, —CCl$_3$, or —CBr$_3$.

6. The poly(amide-imide) copolymer according to claim 4, wherein the at least one diamine comprises the diamine represented by Chemical Formula 2A and the diamine represented by Chemical Formula 2, wherein R$^{2'}$ of Chemical Formula 2A comprises two or more phenylene groups linked through a single bond, wherein each of the two or more phenylene groups are substituted with —CF$_3$, and wherein R$^2$ of Chemical Formula 2 comprises two or more unsubstituted phenylene groups linked through —O—.

7. The poly(amide-imide) copolymer according to claim 4, wherein the at least one diamine comprises the diamine represented by Chemical Formula 2A and the diamine represented by Chemical Formula 2, wherein R$^{2'}$ of Chemical Formula 2A comprises two phenylene groups linked through a single bond, wherein each of the two phenylene groups are substituted with —CF$_3$, and wherein R$^2$ of Chemical Formula 2 comprises two unsubstituted phenylene groups linked through —O—.

8. The poly(amide-imide) copolymer according to claim 4, wherein an amount of the diamine represented by Chemical Formula 2 is less than an amount of the diamine represented by Chemical Formula 2A.

9. The poly(amide-imide) copolymer according to claim 4, wherein a mole ratio of the diamine represented by Chemical Formula 2 and the diamine represented by Chemical Formula 2A is from 30:70 to 1:99.

10. The poly(amide-imide) copolymer according to claim 1, wherein an amount of the diamine represented by Chemical Formula 2 is less than or equal to 20 mole percent based on the total amount of the at least one diamine.

11. The poly(amide-imide) copolymer according to claim 1, wherein an amount of the diamine represented by Chemical Formula 2 is less than or equal to 10 mole percent based on the total amount of the at least one diamine.

12. The poly(amide-imide) copolymer according to claim 1, wherein in Chemical Formula 3, R$^3$ is an unsubstituted phenylene group, and X$^1$ and X$^2$ are each independently selected from —Cl, —OH, or —OCH$_3$.

13. The poly(amide-imide) copolymer according to claim 1, wherein in Chemical Formula 1, R$^1$ is a tetravalent C4 saturated aliphatic hydrocarbon ring group.

14. The poly(amide-imide) copolymer according to claim 1, which is the reaction product of the at least one tetracarboxylic acid dianhydride, the at least one diamine, and the at least one dicarboxylic acid derivative in a mole ratio of 40 to 80:100:60 to 20, respectively.

15. The poly(amide-imide) copolymer according to claim 1, which is the reaction product of the at least one tetracarboxylic acid dianhydride, the at least one diamine, and the at least one dicarboxylic acid derivative in a mole ratio of 50 to 70:100:50 to 30, respectively.

16. An article comprising the poly(amide-imide) copolymer according to claim 1.

17. The article according to claim 16, wherein the article is a film having a tensile modulus of greater than or equal to 6.5 Giga Pascal and an average light transmittance of greater than or equal to 87.5 percent in a wavelength range of 350 nanometers to 750 nanometers, when the thickness of the film is about 50 micrometers to 100 micrometers (μm).

18. A window film for a display device comprising a poly(amide-imide) copolymer according to claim 1.

19. A display device comprising the article according to claim 16.

20. The display device according to claim 19, wherein the display device is a flexible display device.

* * * * *